US007698556B2

(12) United States Patent
Zhang et al.

(10) Patent No.: US 7,698,556 B2
(45) Date of Patent: Apr. 13, 2010

(54) SECURE SPONTANEOUS ASSOCIATIONS BETWEEN NETWORKABLE DEVICES

(75) Inventors: Kan Zhang, Palo Alto, CA (US); Timothy P. J. G. Kindberg, Bristol (GB); Jean Tourrilhes, Mountain View, CA (US); Seunghyun Im, Charlotte, NC (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1218 days.

(21) Appl. No.: 11/066,584

(22) Filed: Feb. 25, 2005

(65) Prior Publication Data

US 2006/0209843 A1 Sep. 21, 2006

(51) Int. Cl.
*H04L 9/32* (2006.01)
(52) U.S. Cl. ............... 713/171; 380/258; 380/278
(58) Field of Classification Search ........... 713/171; 370/395.32; 380/258, 278, 283–285
See application file for complete search history.

(56) References Cited

U.S. PATENT DOCUMENTS

| 6,453,159 | B1 * | 9/2002 | Lewis | 455/411 |
|---|---|---|---|---|
| 6,526,506 | B1 * | 2/2003 | Lewis | 713/153 |
| 6,538,595 | B1 * | 3/2003 | Tucker et al. | 341/178 |
| 6,563,919 | B1 * | 5/2003 | Aravamudhan et al. | 379/230 |
| 6,772,331 | B1 * | 8/2004 | Hind et al. | 713/151 |
| 6,904,055 | B2 * | 6/2005 | Pichna et al. | 370/467 |
| 7,130,584 | B2 * | 10/2006 | Hirvonen | 455/41.2 |
| 7,181,620 | B1 * | 2/2007 | Hur | 713/171 |
| 7,185,199 | B2 * | 2/2007 | Balfanz et al. | 713/168 |
| 7,194,438 | B2 * | 3/2007 | Sovio et al. | 705/50 |
| 7,206,855 | B1 * | 4/2007 | Hamilton et al. | 709/232 |
| 7,275,156 | B2 * | 9/2007 | Balfanz et al. | 713/168 |
| 7,278,017 | B2 * | 10/2007 | Skantze | 713/168 |
| 7,370,200 | B2 * | 5/2008 | Kindberg et al. | 713/168 |
| 7,394,864 | B2 * | 7/2008 | Webster et al. | 375/295 |
| 7,426,271 | B2 * | 9/2008 | Conley et al. | 380/33 |
| 7,552,322 | B2 * | 6/2009 | Balfanz et al. | 713/159 |
| 2002/0031228 | A1 * | 3/2002 | Karkas et al. | 380/270 |
| 2003/0217179 | A1 * | 11/2003 | Famolari et al. | 709/245 |
| 2004/0046638 | A1 * | 3/2004 | Kawasaki | 340/5.61 |
| 2004/0192206 | A1 * | 9/2004 | Hirvonen | 455/41.2 |
| 2005/0009469 | A1 * | 1/2005 | Kotola | 455/41.2 |
| 2005/0211760 | A1 * | 9/2005 | Dewan et al. | 235/375 |
| 2005/0239399 | A1 * | 10/2005 | Karabinis | 455/3.02 |

OTHER PUBLICATIONS

Kindberg et al., Validating and Securing Spontaneous Associations between Wireless Devices, 2002, HP Labs.*

(Continued)

*Primary Examiner*—David Garcia Cervetti

(57) ABSTRACT

In a first aspect, the present invention provides a protocol for communications across a securable communication channel between a first device and a second device. The protocol includes the transmission of a plurality of uniquely identifiable messages which each include security-related data, from the first device to the second device. The protocol includes determining whether a subset of messages that are received by the second device comply with at least one predetermined message criterion and are identifiable as having been sent from the first device. In the event that said subset of messages are determined to comply with the predetermined verification criterion (or criteria) and are identifiable as having been sent from the first device, the security-related data is determined to have been successfully communicated to the second device.

11 Claims, 3 Drawing Sheets

OTHER PUBLICATIONS

Kan Zhang and Tim Kindberg, Authorization infrastructure for Nomadic Computing, HPL-2001-228, Oct. 6, 2001, HP Laboratoratories Palo Alto California.

Tim Kindberg and Kan Zhang, Context Authentication Using Constrained Channels, HPL-2001-84, Apr. 21, 2001, HP Laboratories Palo Alto California.

* cited by examiner

SECURE SPONTANEOUS ASSOCIATIONS BETWEEN NETWORKABLE DEVICES

FIELD OF THE INVENTION

The present invention relates generally to establishing and verifying secure associations formed between networkable devices.

BACKGROUND OF THE INVENTION

One of the goals of modern computing is to provide people with ubiquitous computing environments. In these computing environments it is necessary to allow devices to become spontaneously associated and interoperable with other devices.

An association can be said to have been made between two (or more) devices when each device possesses data (e.g. another device's network address) that allows the devices to communicate with each other. An association is considered to be secure if a secret encryption key has been established and is known only to the associated devices.

Due to the ad-hoc nature of such spontaneous associations the connections formed between devices will generally take place over wireless communication links. However, in some situations wired connections, or combinations of wired and wireless connections will also be used to make spontaneous associations between devices.

The creation of spontaneous associations between devices raises security concerns for users of the devices. In the first instance there is the need for suitable key-exchange protocols to establish secure associations between devices. However even once a key-exchange protocol has been run it is difficult, if not impossible, for the user(s) of the associated devices to verify that the key-exchange protocol has run successfully and that the association is truly secure.

SUMMARY OF THE INVENTION

In a first aspect, the present invention provides a protocol for communications across a securable communication channel between a first device and a second device. The protocol includes the transmission of a plurality of uniquely identifiable messages which each include security-related data, from the first device to the second device. The protocol includes determining whether a subset of messages that are received by the second device comply with at least one predetermined message criterion and are identifiable as having been sent from the first device. In the event that said subset of messages are determined to comply with the predetermined verification criterion (or criteria) and are identifiable as having been sent from the first device, the security-related data is determined to have been successfully communicated to the second device.

BRIEF DESCRIPTION OF THE DRAWINGS

Embodiments of present invention will now be described by way of non-limiting example only, with reference to the accompanying drawings, in which.

DETAILED DESCRIPTION OF THE EMBODIMENTS

Figure 1:
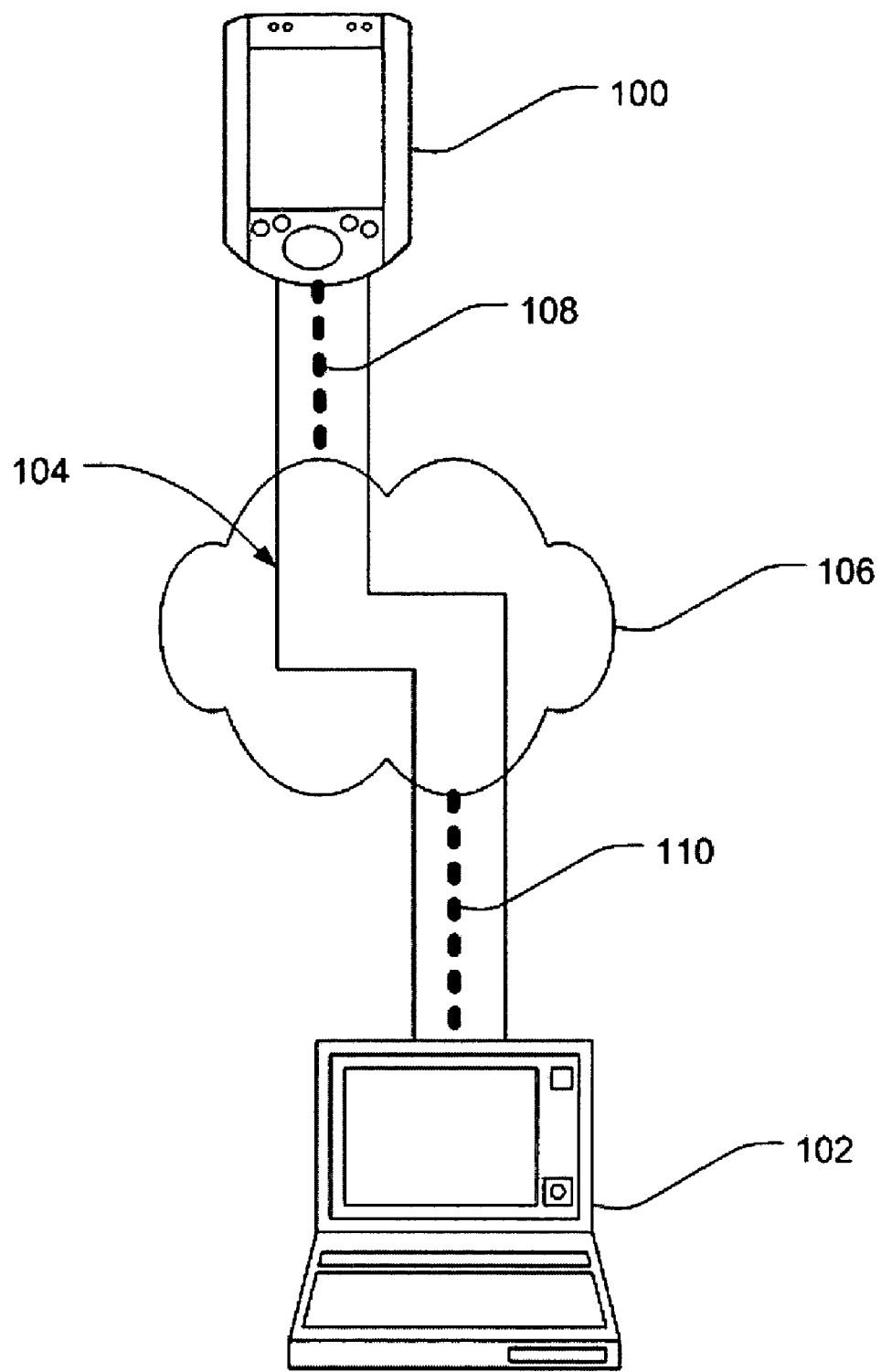
FIG. 1 shows a schematic representation of an association formed between two devices in accordance with an embodiment of the present invention.

FIG. 1 shows a schematic diagram representing an association 104 that has been formed between two computer devices, namely a personal digital assistant (PDA) 100 and a notebook computer 102.

In the present example, the PDA 100 and the notebook computer 102 are connected to a communications network 106 via wireless links 108 and 110 respectively. The communications network 106 is a broadcast network operating according to a standard such as IEEE 802.11a, IEEE 802.11b and IEEE 802.11g. In such a network 106 both devices 100 and 102 are required to tune to a common broadcast channel and receive all packets sent on that channel.

As will be appreciated by those skilled in the art the association 104 between the devices 100 and 102 may alternatively be formed over any type of communications channel, including non-broadcast type wireless or wired communications links or via any combination of wired and wireless computer networks. However the ability of the exemplary embodiments described herein to operate in a broadcast network of the type described above is particularly advantageous.

It should also be noted that the operation of the protocols described herein can be conducted over a network connection or communication channel that is different to the channel over which the association is formed. However, for clarity of description, the exemplary embodiments are described herein with the protocols and the association using the same communications channel.

Figure 2:
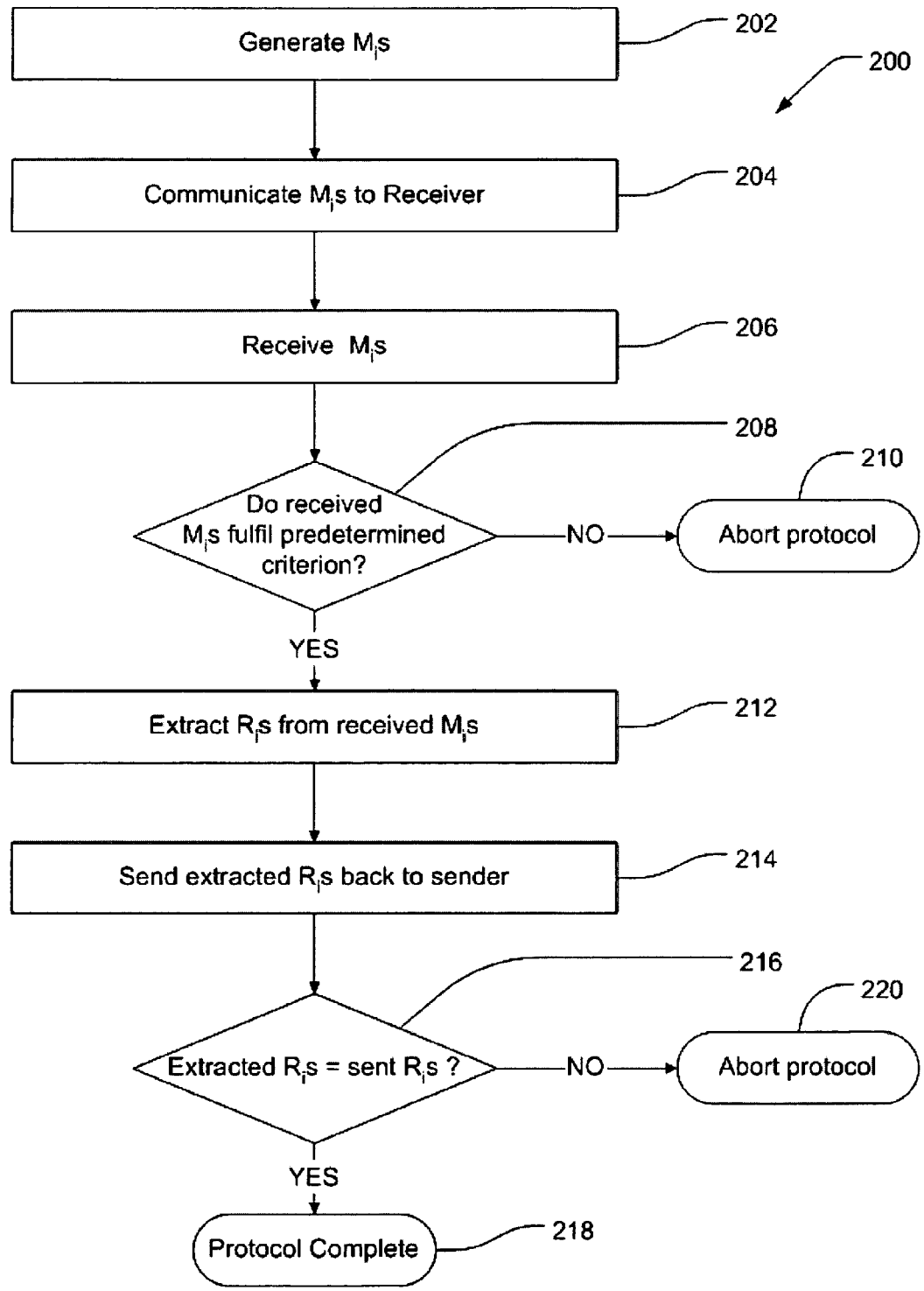
FIG. 2 shows a flow chart depicting a method for ensuring that associated devices each know the other's public key and network address in accordance with an embodiment of the present invention.

FIG. 2 shows a flow chart depicting a process 200 for communicating a public key of a sender device to a receiver device that can be used when forming an association such as the one described in connection with FIG. 1. For example the process 200 could be used to exchange public keys between devices as a precursor to running a key-exchange protocol to secure the association. The encryption of the association 104 can be implemented using a key exchange protocol, such as the Diffie-Hellman key exchange protocol, described in Whitfield Diffie and Martin Hellman, "New Directions in Cryptography", IEEE Transactions on Information Theory, v. IT-22, n.6, November 1976. Other key exchange protocols may also be used.

Prior to exchanging public keys the devices to be associated must determine which of them will initially be the sender device and which will be the receiver. This determination can be made in accordance with a predetermined selection protocol.

The selection protocol could be implemented in a wide variety of ways, for example the first sender may be designated as the device having the highest value IP address. Alternatively if the associated devices include a public device (such as a network printer) and a private device, the private device can be designated to be the first sender. In a preferred embodiment the selection protocol should be secure in the sense that a attacker should not be able to fool both devices into either the sender or receiver mode.

For illustrative purposes suppose that the PDA 100 is the initial "sender" and that the notebook 102 is the initial "receiver" device.

In a first step of the method 202 the sender device generates a plurality of messages $M_i$ where i=1 . . . n. Each of the messages $M_i$ include the sender's public key (sender_key), the sender's network address (sender_add) and a randomly selected message identifier $R_i$. Each message $M_i$ also includes a value $H_i$ that represents a transform of sender_key, sender_add and $R_i$.

In the general case the transformation can take the form of function h(x) which generates a substantially irreversible transformation of its input. The function h(x) is preferably a one-way function that has the property that given h(x) it is computationally infeasible to compute x. The transformation chosen in the preferred embodiment is a secure hash function, such as MD5 or SHA-1.

Each message $M_i$ is formatted according to a predetermined message format. In the preferred embodiment $M_i$ takes the form ($H_i$,sender_key,sender_add,$R_i$). The form of the message can be used at a later stage to verify that the message has not been tampered with or otherwise corrupted in transit between the sender and the receiver device.

As will be appreciated the sender device can generate a plurality of messages for use in the method by either precomputing them or generating them on-the-fly.

In the next step 204 the messages $M_i$ are sent to the receiver device. As the sender-key included in the message is the public key of the sender device there is no need for secrecy when sending the messages $M_i$.

Preferably the messages are sent at a predefined rate, e.g. 100 messages per second. If the messages $M_i$ are precomputed a sufficient number of messages should be computed to allow the sender device to send messages for a predetermined time period, say between 1 and 3 seconds. For safety some arbitrary number, say 1000, messages can be precomputed. If on the other hand the messages are being computed on the fly then the sender device can continue generating the messages and communicating them to the receiver device until the sender device hears back from the receiver device in step 212 (as will be explained below).

In the network as described above the receiver device is configured to monitor all messages sent on the broadcast channel regardless of the intended receiver, and at 206 a plurality of messages are received at the receiver device.

Next 208 the receiver device checks whether the messages $M_i$ that it has received meet one or more predetermined criteria. In the preferred embodiment the receiver device checks whether the received messages are in the predetermined data format described above, that is that $M_i$=($H_i$,sender_key,sender_add,$R_i$). The receiver device also checks whether the received $H_i$ is the transform of the received sender_key, sender_add, and received $R_i$.

The receiver device also checks that for all of the messages received have the same sender_add value and the same sender_key value and that the messages $M_i$ are received at least at a second predefined rate. The messages should be received by the receiver device at a rate comparable to the transmission rate used by the sender device. However in practice the second predefined rate may be less that the first predefined rate. If the second predefined rate is too far below the first predefined rate of the messages $M_i$ then the protocol can be aborted, as this may be a sign that a man-in-the-middle attack on the association is being mounted.

If any of the received messages do not meet the predetermined criterion the protocol is aborted at 210. Alternatively if the predetermined criteria is met the second device extracts 212 the message identifiers $R_i$ from each received message for later use.

The receiver device is configured to continue receiving messages until a predetermined number of messages $M_i$ have been received or for a until a predetermined time has elapsed from the time at which it first receives a message $M_i$ from the sender device. Once either of these criteria are met the receiver device switches into sending mode and stops monitoring the broadcast channel and the extracted message identifiers $R_i$ are sent back to the sender device at step 214.

Next 216 the sender device checks whether the each received extracted message indicator $R_i$ is the same as the message indicators $R_i$ sent in the original plaintext of the corresponding message $M_i$.

If the extracted $R_i$ equals the sent $R_i$ then the public key, and network address of the first device have successfully been communicated to the user of the second device 218.

Alternatively if the decrypted message identifier $R_i$ of any one of the messages $M_i$ is not the same as the original message identifier then the protocol is aborted at 220.

In the preferred embodiment once it has been verified that the first device's network address and public key have successfully been sent to the second device, the roles of the devices can be switched and the process repeated to communicate the public key and network address of the second device to the first device. Thus in the present example the PDA 100 becomes the receiver and the notebook computer 102 becomes the sender and steps 202 to 220 are repeated.

By running the protocol successfully in both directions the users of the devices can be certain that each of the devices has the correct public key of the other device and the correct network address of the other device. The devices can then use any public key based key exchange protocol to set up a shared secret key to secure an association formed between them.

Figure 3:
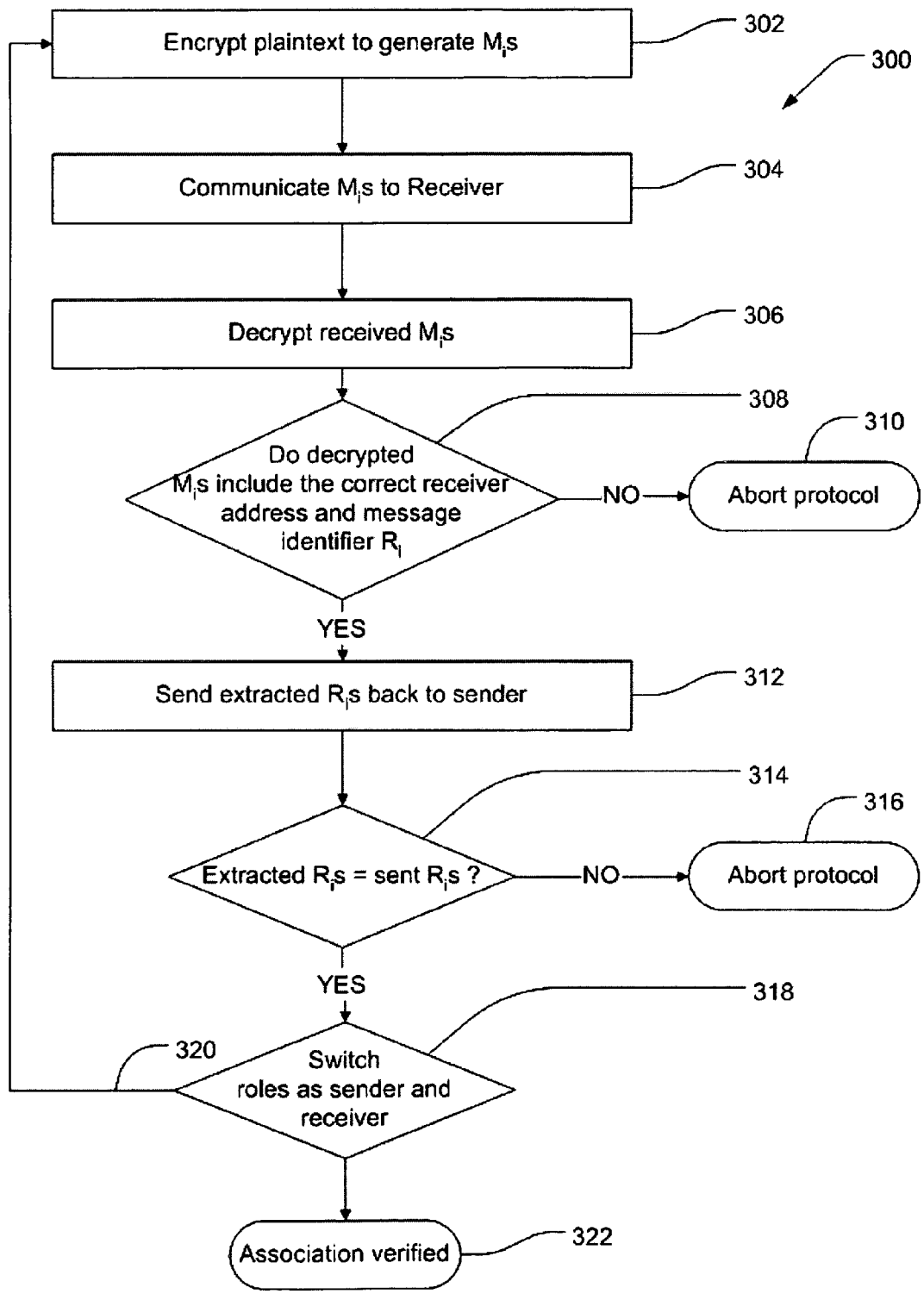
FIG. 3 shows a flow chart depicting a method for verifying that a secure association has been made between two devices in accordance with an embodiment of the present invention.

When forming a spontaneous association between two devices there will be times that even though a key exchange protocol has been run it will be necessary or desirable for the users of the devices to verify that the key change protocol was run correctly and that both devices have the same secret key. An exemplary embodiment of a protocol for performing such a verification will now be described with reference to FIGS. 1 and 3. The association that has been formed is as described in connection with FIG. 1. The association has supposedly been encrypted using a key exchange protocol. The key exchange protocol is a key exchange protocol having the property that it is impossible for a man in the middle to use the protocol set up the same secret key with both devices 100 and 102 such as the Diffie-Hellman key exchange protocol.

Again it is a necessary as a precursor to running the verification protocol that the first and second devices use some predefined selection protocol to determine which device (the PDA 100 or Notebook Computer 102) will be the initial "sender" and which will be the initial "receiver". The same selection protocol used above may again be used.

In a first step 302 of the protocol the sender device generates a plurality of messages $M_i$, where $M_i$ includes the receiver address (receiver_add) and a message identifier ($R_i$). The message $M_i$ is encrypted using the secret key of the sender device. In the preferred embodiment $R_i$ s a random number which is chosen for inclusion in message $M_i$.

As described above in connection with the key exchange protocol the messages $M_i$ can be pre-computed, or generated on the fly. If the messages are pre-computed the number of messages generated n should be large enough so that the sender will not run out of messages when transmitting them to the receiver advice in subsequent steps of the method.

In the next step 304 the sender device sends messages $M_i$ where i=1 . . . n to the receiver device at a predefined rate. In the preferred embodiment the predefined rate is 100 messages per second. The messages $M_i$ may be transmitted over a channel designated for running this protocol, or alternatively the messages $M_i$ may be broadcast over some predefined channel.

In the preferred embodiment, the sender device transmits messages for between 1 and 3 seconds so that the receiver device had sufficient time to configure itself into "receiver" mode.

In receiver mode the receiver device listens for all messages sent on the designated communications channel regardless of its intended receiver (or receivers). For every message the receiving device receives it verifies (at 308) that it can decrypt the message using its encryption key. The receiver device also verifies that the decrypted message include its true receiver address. If either of these verifications steps fails the receiver aborts the protocol at 310.

If the verification is successful then the receiver device stores the received message identifier $R_i$ in its memory. As we appreciated by those skilled in the art a plurality of such messages $M_i$ will be decrypted and plurality of message identifiers $R_i$ will be stored.

The receiver device is configured to continue listening until a predetermined number of messages have been received, decrypted, and had their message identifiers $R_i$ extracted until a predetermined time has elapsed from the time at which it first receives a message from the sender device. Once either of these criteria are met the receiver device switches into sending mode and stops monitoring the broadcast channel. In step 312 the receiver device sends each of the stored message identifiers $R_i$ back to the sender device.

The sender device at 314 verifies that the message identifiers $R_i$ received from the receiver device match those that were originally sent by it at 304. If the message identifiers $R_i$ do not match those which were originally included in the plaintext of the corresponding message $M_i$ the sender device aborts the protocol at 316 and the verification is deemed to have failed.

Alternatively if the received message identifiers $R_i$ match those which were sent originally by the sender device then it is verified that $K_{sender}=K_{receiver}$, where $K_{sender}$ is the secret key possessed by the sender device and $K_{receiver}$ is the secret key possessed by the receiver device. It is also verified that the sender device has the receiver device's correct network address.

In order to complete the verification of the security of the association formed between the two devices the roles of the sender device and receiver device are switched (318) and the protocol is repeated (320) to verify that the receiver device has the correct network address of the sender device.

By running the protocol in the reverse direction, that is with the "initial sender" acting as receiver and the "initial receiver" acting as sender, a second check is made on whether both devices share the same secret encryption key, i.e. $K_{sender}=K_{receiver}$.

It will be noted that if the protocols described above are run using a broadcast network such as IEEE 802.11 then difficulties will arise if a plurality of un-associated devices attempt to run the protocol concurrently.

Thus it can be seen from the above that using the preferred embodiment of the above protocol it is possible to verify that the two devices are securely associated without using any additional or specialised hardware such as indicator lights etc.

It will be understood that the invention disclosed and defined herein extends to all alternative combinations of two or more of the individual features mentioned or evident from the text or drawings. All of these different combinations constitute various alternative aspects of the invention.

The foregoing describes embodiments of the present invention and modifications, obvious to those skilled in the art can be made thereto, without departing from the scope of the present invention.

The invention claimed is:

1. A method for communicating a public key of a sender device to a receiver device, the method comprising:
   transmitting a plurality of messages from the sender device to the receiver device at a first predetermined rate, each message including a first message portion including the public key of the sender device and a message identifier, and a value representing a predetermined transformation of the first message portion;
   receiving at least a subset of the plurality of messages at the receiver device;
   verifying that the received messages are received at the receiver device at a rate that is equal to or less than a second predetermined rate, the verification being performed by the receiver device;
   verifying that each received message fulfils at least one predetermined criterion, the verification being performed by the received device;
   extracting a respective message identifier from each received message, the extraction being performed by the receiver device;
   transmitting the message identifiers extracted from the received messages from the receiver device to the sender device; and
   verifying that each of said transmitted message identifiers that are received at the sender device are message identifiers that were included in a message of the plurality of messages transmitted to the receiver device, the verification being performed by the sender device.

2. The method of claim 1 including randomly selecting the message identifier for each message, the random selection being performed by the sender device.

3. The method of claim 1 wherein the value representing the predetermined transformation of the first message portion is generated using a secure hash function by the sender device.

4. The method of claim 1 wherein the first message portion generated by the sender device further includes a network address of the sender device.

5. The method of claim 4, wherein the method is terminated if at least one of the following occur:
   the value representing the predetermined transformation of the first message portion of a message of the subset of messages received by the receiver device is determined to be incorrect by the receiver device;
   a common sender key is determined by the receiver device to be not included in each message of the subset of messages received by the receiver device;
   the messages of the subset of messages received by the receiver device are determined by the receiver device to not have been received at the second predefined rate;
   a common sender network address is determined by the receiver device to be not included in each message of the subset of messages received by the receiver device.

6. The method of claim 1 including
   storing the message identifiers extracted from the received messages by the receiver device at the receiver device; and
   communicating the stored message identifiers from the receiver device to the sender device once a predetermined number of messages have been received by the receiver device.

7. The method of claim 1 including storing the message identifiers extracted from the received messages by the receiver device at the received device; and communicating the stored message identifiers from the receiver device to the sender device after a predetermined period of time has elapsed from a time at which a first message was received by the receiver device.

8. The method of claim 1 in which the messages have a predetermined format, and wherein verifying that each received message fulfils at least one predetermined criterion, includes verifying that each of the subset of messages received by the receiver device are in the predetermined format, the verification being performed by the receiver device.

9. A method for communicating a public key of a sender device to a receiver device, the method comprising:

transmitting a plurality of messages from the sender device to the receiver device at a first predetermined rate, each message including a first message portion including the public key of the sender device and a message identifier, and a value representing a predetermined transformation of the first message portion;

receiving at the sender device from the receiver device a plurality of messages following verification by the receiver device that the messages received at the receiver device were received at a rate that is equal to or less than a second predetermined rate;

verifying that each of said received messages includes a message identifier that was sent to the receiver device in a message of the plurality of messages transmitted to the receiver device, the verification being performed by the sender device.

10. The method of claim 9 wherein the first message portion of the plurality of messages generated by the sender device further includes a network address of the sender device.

11. The method of claim 9 wherein the value representing the predetermined transformation of the first message portion of the messages in the plurality of messages are generated by the sender device using a secure hash function.

* * * * *